Figure 1:
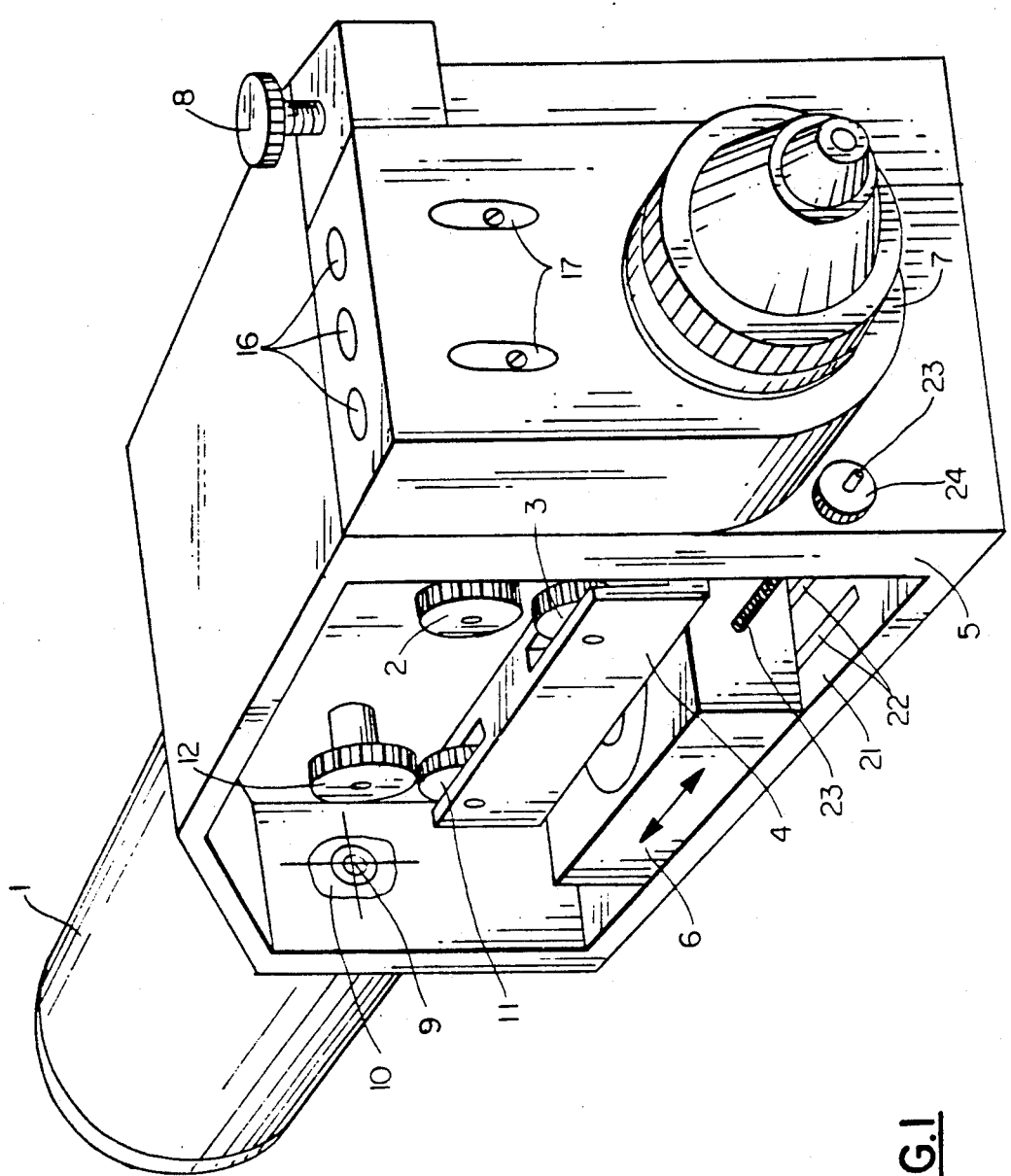

United States Patent [19]

Herber

[11] Patent Number: 5,074,469

[45] Date of Patent: Dec. 24, 1991

[54] WIRE PISTOL

[75] Inventor: Ralph H. Herber, Mainz, Fed. Rep. of Germany

[73] Assignee: The Perkin-Elmer Corporation, Norwalk, Conn.

[21] Appl. No.: 466,364

[22] PCT Filed: Jul. 27, 1989

[86] PCT No.: PCT/EP89/00887

§ 371 Date: Mar. 16, 1990

§ 102(e) Date: Mar. 16, 1990

[87] PCT Pub. No.: WO90/00951

PCT Pub. Date: Feb. 8, 1990

[30] Foreign Application Priority Data

Jul. 27, 1988 [DE] Fed. Rep. of Germany ....... 3825531

[51] Int. Cl.$^5$ .............................................. B05C 5/04
[52] U.S. Cl. ....................................... 239/84; 239/79; 226/187
[58] Field of Search ............................ 239/79, 83, 84; 226/176, 177, 186, 187, 188

[56] References Cited

U.S. PATENT DOCUMENTS

| | | | |
|---|---|---|---|
| 1,096,857 | 5/1914 | Pederquist | 226/187 |
| 1,917,523 | 7/1933 | Irons et al. | 239/84 |
| 2,059,089 | 10/1936 | Clesi et al. | 239/84 |
| 2,091,021 | 8/1937 | Stevens | 239/84 |
| 2,102,395 | 12/1937 | Valentine et al. | 239/84 |
| 2,749,176 | 6/1956 | Steyer | 239/84 |
| 2,769,663 | 11/1956 | Jensen et al. | 239/83 |
| 2,856,237 | 10/1958 | Monroe | 239/84 |
| 3,251,341 | 5/1966 | Eburn, Jr. et al. | 226/187 |
| 3,657,940 | 4/1972 | Wagner | 226/187 |

FOREIGN PATENT DOCUMENTS

| | | | |
|---|---|---|---|
| 1085551 | 2/1955 | France | 226/187 |
| 1585526 | 1/1970 | France | 226/187 |

*Primary Examiner*—Andres Kashnikow
*Assistant Examiner*—Christopher G. Trainor
*Attorney, Agent, or Firm*—H. S. Ingham; E. T. Grimes

[57] ABSTRACT

The invention relates to a wire pistol comprising a wire feed mechanism including a wire feed pulley rotated by a DC motor and a counterpulley for biasing the wire into engagement with the feed pulley. It is an object of the invention to provide a wire pistol of this type in which, in contrast to prior-art wire pistols, no transmission shift operation or no transmission replacement is required over the entire adjustment range of wire feed rates. This object is attained according to the invention by the provision that the DC motor is adapted to have successive operating voltage pulses of variable pulse width and/or variable pulse frequency applied thereto for thus controlling the wire feed rate. This provision ensures that a sufficiently high torque for the wire feed operation is also available at very low wire feed rates, i.e. at low rotational speeds of the motor.

8 Claims, 3 Drawing Sheets

WIRE PISTOL

DESCRIPTION

The invention relates to a wire pistol comprising a wire feed mechanism including a wire feed pulley driven by a motor and a counter-pulley for biasing the wire into engagement with the feed pulley.

A wire pistol of this type is mainly employed in the so-called flame spraying operation. In this application the wire feed mechanism acts to convey the wire into a gas head having a spray nozzle. In the gas head, which is supplied with a combustible gas in combination with compressed air and oxygen, the combustion of the gas causes the wire material to melt, the molten wire material being sprayed and expelled through the nozzle together with the combusted gas.

Known wire pistols having a wire feed mechanism suffer from the disadvantage that the adaptation to wires of different diameters requires both the feed pulley and the counter-pulley to be exchanged. This exchange operation requires the housing of the wire pistol to be opened and thereafter to be closed again, and is therefore very time-consuming. This system moreover requires a set of pulleys to be always held in readiness for the exchange operation.

It is an object of the invention to provide a wire pistol of the type defined above, in which the adaptation to different wire diameters is simplified and does in particular not require the pistol housing to be opened and does not either require any sets of pulleys to be held in readiness for replacement.

This object is attained according to the invention by the provision that the axis of rotation of the counter-pulley or/and the axis of rotation of the feed pulley is/are adjustable over an adjustment range for adapting the feed mechanism to wires of different diameters.

Thanks to this solution according to the invention, the necessity of exchanging the feed pulley and the counter-pulley in response to changes of the wire diameter is eliminated, so that the effort for adapting the wire pistol to different wire diameters is reduced. In addition the solution according to the invention eliminates the necessity of holding pulley sets in readiness for replacement.

In an advantageous embodiment of the invention, a transmission may be provided for transmitting the rotation of the feed pulley to the counter-pulley, the transmission being suitably composed of respective gears concentrically connected to the feed pulley and the counter-pulley, respectively. The transmission of the rotation results in an increased reliability of the wire feed operation, since the positively driven counter-pulley itself contributes to the transport of the wire.

When employing two gears concentrically connected to the feed pulley and the counter-pulley, respectively,. the teeth of the gears are advantageously formed with the reference profile I according to DIN 3972 for a number of nine teeth. This configuration of the teeth permits the rotation to be transmitted in a slip-free and continuous manner within a wide adjustment range of the gear axes.

The counter-pulley may suitably be mounted on a bearing element connected by a hinged link to the wall of the housing provided for the wire pistol, and subjected to the action of a pressure engagement device operable to bias the wire into engagement with the feed pulley by way of the bearing element and the counter-pulley.

In a particularly suitable embodiment of the invention the bearing element may be formed as a balance beam carrying the counter-pulley and another counter-pulley for a detector pulley engaging the wire for detecting the wire feed rate. The detector pulley engaging the wire permits the actual value of the wire feed rate to be very accurately measured. This is an important requirement for an effective control of the feed rate.

A feed control, particularly a slippage control, can only be achieved by controlling the biasing force acting on the wire for engaging it with the feed pulley. This biasing force may for instance be varied by mounting the pressure engagement device, which may be formed as a pressure cylinder with a variable internal pressure, so as to be displaceable along the balance beam. The displacement of the point of attack of the force acting on the balance beam and the variation of the cylinder pressure result in the force transmitted from the counter-pulley to the feed pulley through the wire.

Further possible embodiments of the invention are apparent from the subclaims.

Figure 2:
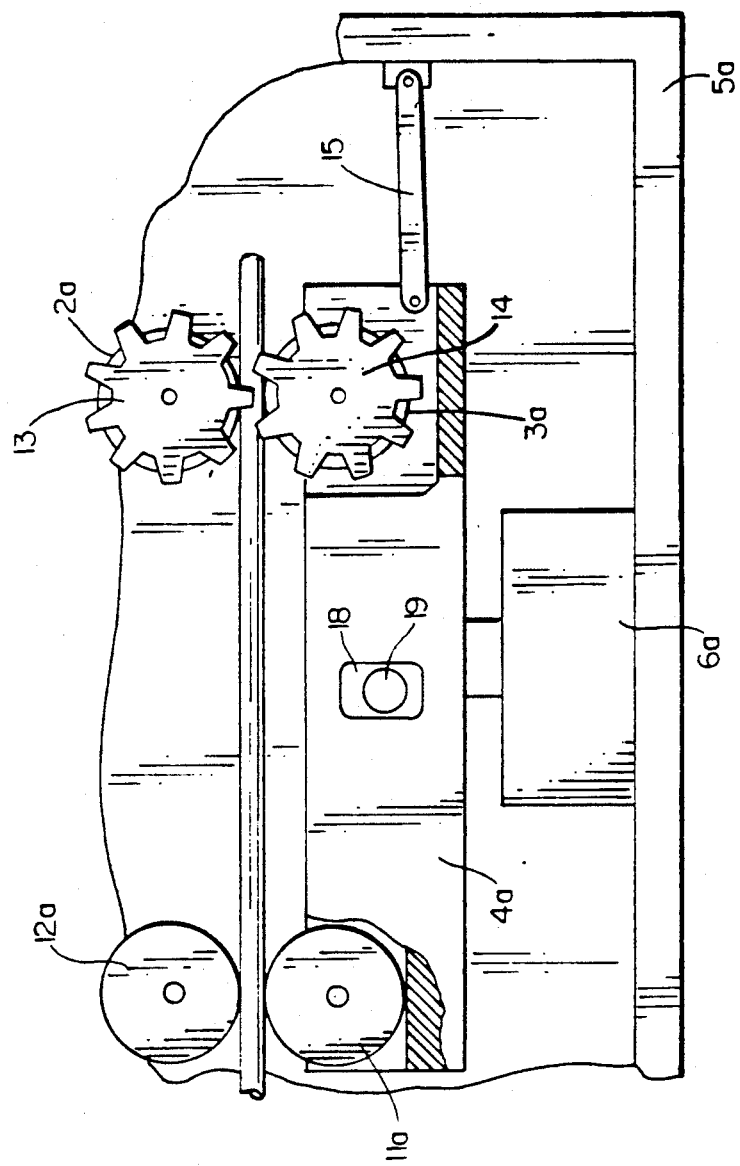

Embodiments of the invention shall now be further explained and described by way of example with reference to the accompanying drawings, wherein:

FIG. 1 shows an embodiment of a wire pistol according to the invention, including a gas head for the flame-spraing operation, FIG. 2 shows an embodiment of a wire feed mechanism of a wire pistol according to the invention, including a transmission for transmitting the rotation of the shows a further embodiment of the wire pistol according to the invention.

In FIG. 1, reference numeral 1 designates a motor for rotating a feed pulley 2. The wire is biased into engagement with feed pulley 2 by a counter-pulley 3 mounted on a mounting beam 4. Rotation of the feed pulley causes the wire to be advanced into a gas head 7 provided with gas supply connections 16.

In the present example the axis of the feed pulley is mounted at a fixed position and extends through the wall of a separate housing provided for the wire feed mechanism as part of the wire pistol housing. The mounting beam is adjustably supported relative to the wire. The adaptation to different wire diameters is accomplished by adjustment of the pressure engagement device which in the present case is formed as a pressure cylinder acting on mounting element 4, itself formed as a balance beam.

As a result of the fixed position of the axis of the feed pulley, the position of the longitudinal axis of the wire changes in response to variations of the wire diameter. In view of this displacement of the wire's longitudinal axis, the gas head 7 is adjustably mounted, in the present case secured to housing 5 by means of screws guided in elongate holes and displaceable by means of a rotatable spindle 8. The adaptation of the position of the gas head to varying positions of the wire's longitudinal axis requires considerably less effort than the formerly required replacement of the feed and counter-pulleys.

With the same facility the adaptation to varying positions of the wire's longitudinal axis can be accomplished at the opposite housing wall, whereat the wire is guided through a wire guide 10 into the housing provided for the wire feed mechanism. To this purpose there may be provided wire guides 10 insertable in the housing wall and formed with passage bores 9 having a diameter corresponding to the thickness of the wire and a passage bore axis extending in alignment with the longitudinal axis of the respective wire.

In the present embodiment the balance beam acting as the mounting element for the counter-pulley has mounted thereon a further pulley 11 acting as a counter-pulley for a detector pulley 12. The detector pulley 12 serves to determine the actual value of the wire feed rate which may be supplied to a control device for controlling the wire feed rate. The wire feed rate is controlled in particular by controlling the force biasing the counter-pulley into engagement with the feed pulley to thereby eliminate slippage between between the feed pulley and the wire. In the present example this control function is achieved by the provision that the internal pressure of the pressure cylinder acting as the pressure engagement device 6 is variable and the pressure engagement device itself is displaceable along the mounting beam, so that the point of attack of the force acting on the balance beam is variable, as a result of which the pressure engagement force of the pressure engagement device is variably distributed between the feed pulley and the detector pulley depending on the position of the point of attack.

When the pressure engagement device 6 is mounted for horizontal displacement in the longitudinal direction of the balance beam 4, the bottom 21 of housing 5 is suitably formed with dovetail grooves 22 for receiving correspondingly shaped tongues (not specifically shown) therein. For the adjustment of the pressure engagement device 6 in the horizontal direction there may then be provided a threaded spindle 23 secured to the pressure engagement device 6 and adapted to be adjusted by means of a rotatable adjustment knob 24 mounted at an axially fixed position in alignment with the spindle on the front face of the housing. The pressure engagement device 6 may also be manually adjustable in a similar manner, or may even be mounted at a fixed position relative to the housing 5.

It would also be conceivable to employ a pressure engagement device of which only the pressure engagement force is variable, and which acts only on the feed pulley through a mounting element and the counter-pulley mounted thereon.

The feed mechanism shown in FIG. 2 is provided with a transmission for transmitting the rotation of feed pulley 2a to counter-pulley 3a. This transmission of the rotation is effective to increase the reliability of the wire feed, particularly in the case of a controlled feed mechanism, due to the fact that the positively rotated counter-pulley contributes directly to the wire feed operation.

In the present embodiment the transmission is composed of two camming gears 13 and 14 concentrically connected to the feed pulley and the counter-pulley, respectively. The camming engagement is maintained within a certain adjustment range of the axis of the counter-pulley. A slip-free and continuous transmission of the rotation within a wide adjustment range is particularly ensured when the peripheral teeth of the gears are formed with the reference profile I according to DIN 3972 for a number of nine teeth.

Figure 3:
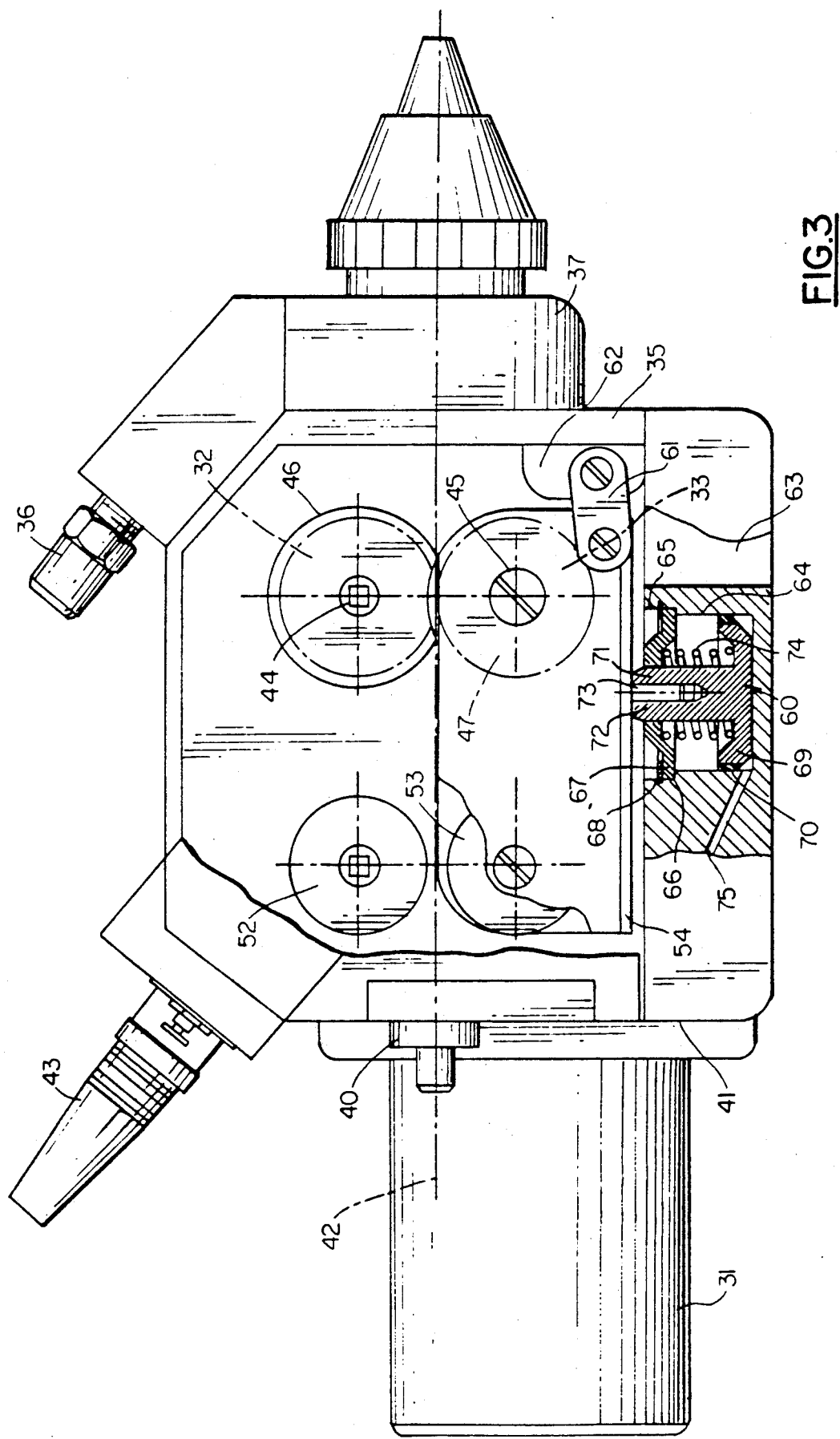

Shown in FIG. 3 is another embodiment of a wire pistol according to the invention in lateral elevation, parts of the sidewall being broken away for affording a view of the diagrammatic illustration of the interior components, other parts being depicted in section. Disposed on the rear side of the housing 35 is a feed motor 31, while on the opposite end face of the housing a gas head 37 is mounted on the housing 35 for adjustment in the vertical direction in FIG. 3, the adjustment devices therefor being suitably of similar construction as the adjustment devices shown in FIG. 1. Provided on the rear side 41 of the housing is a wire guide 40 with the center axis 42 of a wire (not shown) extending through the wire pistol extending therethrough. For varying the position of this longitudinal center axis 42 the wire guide 40 may be adjusted in the vertical direction in a similar manner as the gas head 7, i.e. in the drawing plane of FIG. 3. Designated at 36 is a gas supply conduit for the supply of a gas to the gas head 7. The connector nipple 43 may be used for the introduction of electric leads. The wire feed pulley 32 cooperates with a counter-pulley 33. A pair of camming gears 46, 47 (not specifically shown) are fixedly secured to the axles 44 and 45 of the feed pulley and the counter-pulley, respectively. Additionally provided are a detector pulley 52 and a further counter-pulley 53. Both counter-pulleys 53 and 33 are rotatably mounted on a balance beam 54 supported on the one hand on a pressure plunger indicated at 60 and connected on the other hand by a hinged link 61 to a stationary bearing block 62 fixedly connected to the housing 35. Link 61 is pivotally hinged both to bearing block 62 and to balance beam 54.

The pressure engagement device generally indicated at 60 is constructed as follows: Formed in the bottom 63 is a blind bore 64 the open end of which is enlarged to form a bore section 65 of larger diameter. Supported on a shoulder 66 formed between the blind bore and the enlarged bore section 65 is a retaining ring 67 secured in position by a circlip 68. Displaceably guided in blind bore 64 is a piston member 69 having an inverted T-shape and sealed against the interior wall surface of the blind bore by an O-ring. The stem or plunger 71 of the T-shaped piston projects upwards through a central opening formed in retaining ring 67. Formed in stem 71 to extend in its longitudinal direction is a blind bore 72 whereinto a plunger 73 may be inserted so as to project upwards from the stem. Disposed between the enlarged portion of the T-shaped piston 69 and the bottom surface of the retaining ring 67 is a helical spring 74 acting to bias the T-shaped piston downwards in the direction of the bottom of the blind bore 64. The lower end of the blind bore 64 also communicates with a supply passage 75 for a pressure fluid.

The pressure engagement device 60 is substantially operated to bias the wire to be fed into engagement with the feed pulley for thereby eliminating slippage therebetween by supplying a pressurizing fluid via supply passage 75. As a result, the T-shaped piston 69 is forced upwards relative to the retaining ring 67 against the bias of the spring 74, whereby the balance beam 54 supported on the upper end of the piston is raised in the vertical direction until the counter-pulleys 33 and 53 are forced into engagement with the wire (not shown) to be fed. The pressure of the pressurizing fluid supplied to the passage 75 may be varied for controlling the thus exerted engagement force.

In the present embodiment the balance beam 4a acting as the mounting element is connected by a hinged link 15 to the wall 5a of the housing provided for the wire feed mechanism. For improved guidance of the balance beam the latter may be formed with a guide hole 18 for the engagement of a guide pin 19 projecting from the housing wall.

I claim:

1. A wire pistol including a wire feed mechanism, said feed mechanism comprising a motor (1), a wire feed pulley (2) rotated by said motor, a detector pulley (12) for monitoring feed rate of a wire, a movable bearing element (4), a first counter-pulley (3) mounted on said bearing element and disposed to bias the wire into engagement with said feed pulley, and a second counter-pulley (11) mounted on said bearing element and disposed to bias the wire into engagement with said detector pulley, said bearing element being formed as a balance beam having said first counter-pulley and said second counter-pulley oppositely mounted thereon, and wherein the wire feed mechanism further comprises a pressure engagement device which acts on said balance beam in the vertical direction such that said bearing element is adjustable and said first counter-pulley and said second counter-pulley each have an axis of rotation adjustable over an adjustable range for adapting said feed mechanism to feed wires of different diameters, and wherein said pressure engagement device (6) is also displaceable along said balance bear in the horizontal direction.

2. A wire pistol according to claim 1, further comprising a transmission for transmitting rotation of said feed pulley (2) to said counter-pulley (3).

3. A wire pistol according to claim 2, wherein said transmission is composed of respective gears concentrically connected to said feed pulley (2) and said counter-pulley (3), respectively.

4. A wire pistol according to claim 3, wherein the teeth of said gears are formed with the reference profile 1 according to DIN 3972 for a number of nine teeth.

5. A wire pistol according to claim 1, wherein the wire pistol further includes a housing (5), and the wire feed mechanism further comprises a hinged link (15) connected between said bearing element (4) and the housing (5).

6. A wire pistol according to claim 1, wherein said pressure engagement device (6) is formed as a pressure cylinder.

7. A wire pistol according to claim 1 wherein the wire extends through said wire feed mechanism into a flame spraying gas head (7), and the position of said gas head (7) is adaptable to the varying position of the longitudinal axis of the wires having different diameters.

8. A wire pistol according to claim 7 wherein the position of said gas head (7) is adjustable by means of a spindle (8).

* * * * *

UNITED STATES PATENT AND TRADEMARK OFFICE
CERTIFICATE OF CORRECTION

PATENT NO. : 5,074,469
DATED : December 24, 1991
INVENTOR(S) : Ralph H. Herber

It is certified that error appears in the above-indentified patent and that said Letters Patent is hereby corrected as shown below:

Column 2, line 32, after "of the" insert --feed pulley to the counterpulley, and--;
        line 33, before "shows" insert --FIG. 3--;
Column 5, penultimate line, change "bear" to --beam (4)--;
Column 6, line 5, after "gears" insert --(13, 14)--;

Signed and Sealed this

Second Day of November, 1993

Attest:

BRUCE LEHMAN

Attesting Officer      Commissioner of Patents and Trademarks